(12) United States Patent
Stessen

(10) Patent No.: US 10,152,777 B2
(45) Date of Patent: *Dec. 11, 2018

(54) DYNAMIC RANGE CODING FOR IMAGES AND VIDEO

(71) Applicant: KONINKLIJKE PHILIPS N.V., Eindhoven (NL)

(72) Inventor: Jeroen Hubert Christoffel Jacobus Stessen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/542,768

(22) PCT Filed: Dec. 12, 2016

(86) PCT No.: PCT/EP2016/080538
§ 371 (c)(1),
(2) Date: Jul. 11, 2017

(87) PCT Pub. No.: WO2017/102606
PCT Pub. Date: Jun. 22, 2017

(65) Prior Publication Data
US 2018/0276801 A1    Sep. 27, 2018

(30) Foreign Application Priority Data
Dec. 17, 2015 (EP) .................................. 15200630

(51) Int. Cl.
*H04N 19/98* (2014.01)
*G06T 5/00* (2006.01)
*H04N 19/85* (2014.01)

(52) U.S. Cl.
CPC ............ *G06T 5/009* (2013.01); *H04N 19/85* (2014.11); *H04N 19/98* (2014.11); *G06T 2207/10024* (2013.01); *G06T 2207/20208* (2013.01)

(58) Field of Classification Search
CPC combination set(s) only.
See application file for complete search history.

(56) References Cited

U.S. PATENT DOCUMENTS

2015/0010059 A1    1/2015  Hattori

FOREIGN PATENT DOCUMENTS

EP        2750101 A1 *  7/2014  ............. G06T 5/007
WO    2013144809 A2    10/2013
(Continued)

OTHER PUBLICATIONS

Hattori S. et al., "HLS SEI message for Knee Function Information", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0050-v2, Jan. 15, 2014 (Jan. 15, 2014), XP030115514, abstract, p. 14: section D.2.15, p. 10: section D.3.25; figures 2-2, D10.

(Continued)

*Primary Examiner* — Siamak Harandi

(57) ABSTRACT

For obtaining an good yet easy to use luminance dynamic range conversion, we describe an HDR video decoder (250) comprising an image color processing apparatus (200) arranged to transform an input color (Y'UV_LDR) of a pixel of an input image (Im_in), which input image has a first luminance dynamic range (DR_1), into a red, green and blue color component output color (R'o, G'o, B'o) of a pixel of an output image (Im_res; REC_HDR), which output image has a second luminance dynamic range (DR_2), whereby the peak luminance of the first dynamic range is at least 2 times lower than the peak luminance of the second dynamic range or vice versa, comprising a coarse mapping unit (202; 552) arranged to apply a three-segment brightness re-grading curve which consists of a linear segment for a dark subrange (SR_d) of the range of lumas of the input image colors comprising the darkest input luma values, which is determined by a slope variable (InvBet), a second linear segment (Continued)

for the lightest input luma values in a bright sub-range (SR_br), which is controlled by a second slope variable (InvAlph), and a parabolic segment in between the two linear segment.

15 Claims, 5 Drawing Sheets

(56) References Cited

FOREIGN PATENT DOCUMENTS

| | | |
|---|---|---|
| WO | 2014056679 A1 | 4/2014 |
| WO | 2014128586 A1 | 8/2014 |
| WO | 2014178286 A1 | 11/2014 |

OTHER PUBLICATIONS

Zicong M. et al., "Optimizing a Tone Curve for Backward-Compatible High Dynamic Range Image and Video Compression", IEEE Transactions on Image Processing, IEEE Service Center, Piscataway, NJ, US, vol. 20, No. 6, Jun. 6, 2011 (Jun. 6, 2011), pp. 1558-1571, XP011411814, ISSN: 1057-7149, DOI: 10.1109/TIP. 2010.2095866 abstract, section 1; figures 1, 3.

* cited by examiner

DYNAMIC RANGE CODING FOR IMAGES AND VIDEO

CROSS-REFERENCE TO PRIOR APPLICATIONS

This application is the U.S. National Phase application under 35 U.S.C. § 371 of International Application No. PCT/EP2016/080538, filed on 12 Dec. 2016, which claims the benefit of European Patent Application No. 15200630.0, filed on 17 Dec. 2015. These applications are hereby incorporated by reference herein.

FIELD OF THE INVENTION

The invention relates to apparatuses and methods and resulting products like data storage (e.g. blu-ray disk) or transmission products or signals, which enable the conversion of an image, or a video of images, of a first luminance dynamic range to an image or video of second luminance dynamic range (which in most of the below embodiments will be lower than the first range of the input image on an encoding side, and higher on a decoding side), in particular starting from a master high dynamic range (HDR) image (e.g. 1000 nit peak brightness, being the peak brightness of its associated reference display) which may non-limiting e.g. be a master HDR grading created with a particular color look defined by a color grader, or a raw television program capture ready for broadcasting, etc, and then the encoding and communication via a second dynamic range image, or in particular set of images (a video), which are encoded on another dynamic range than the input master, and may e.g. typically be encoded as standard dynamic range images (SDR; which are defined with the legacy Rec. 709 OETF; and graded to look optimal on a 100 nit peak brightness (PB) reference monitor), or also any LDR (low dynamic range) image encoding, and on the other side of any image communication system corresponding image or video decoders to yield a decoded image, e.g. appropriate for rendering on an at the receiving side available HDR display of 3000 nit PB. The method and apparatus embodiments are in particular suitable for any video encoding respectively decoding which needs to be able to handle higher luminance requirements than legacy (LDR) video coding (which may also be called in this text standard SDR coding). SDR (LDR) video encoding will be encoded typically with the Rec. 709 EOTF, which matches nicely with typical LDR display capabilities having a peak brightness of around the standard value of 100 nit, and black level of 0.1 nit, and we will assume an LDR grading to be made with those standard values. A high dynamic range image is any image not encodable solely by means of a legacy SDR encoding (although some of the tools and apparatuses in place may be re-used as explained below), because it typically has higher image quality characteristics, in particular the peak brightness of the image may be higher (at least 2× higher than 100 nit, but for typical higher quality HDR images e.g. 1000 nit PB, or 5000 nit PB, etc.). In case we mention no further specifics on the low end of the luminance dynamic range, we tacitly assume that at least for understanding the embodiments of this application the skilled reader may assume it to be 0 nit.

BACKGROUND OF THE INVENTION

Recently a number of very different displays have appeared on the market, in particular television signal receiving displays (televisions) with very different peak brightness. Whereas in the past the peak brightness (PB) of so-called legacy low dynamic range (LDR) displays differed by at most something like a factor 2 (somewhere between 80 and 150 nits), the recent trend to ever higher peak brightness has resulted in so-called high dynamic range (HDR) televisions of 1000 nits and above, and displays of 5000 nit PB, and it is assumed that soon various displays of such higher PBs will be on the market. Even in movie theaters one is recently looking at ways to increase the ultimate brightness dynamic range perceived by the viewer. Compared to a 100 nit LDR standard legacy TV, a e.g. 2000 nit display has a factor 20 more peak brightness, which amounts to more than 4 additional stops available, i.e. more ways to render brighter objects in various images. On the one hand, provided one uses also a new generation HDR image generation or capturing system, this allows for much better rendering of HDR scenes or effects. E.g., instead of (soft) clipping the sunny world outside a building or vehicle (as would happen in a legacy LDR grading), one can use the additional available brightnesses on the luminance axis of the HDR TV gamut to display bright and colorful outside areas. This means that the content creator, which we will call non-limiting the color grader (but he may be embodied in various manners, e.g. in a live television production somebody perhaps only adjusting a single dial affecting some color properties, in particular of the encoding, at some times), has room to make very beautiful dedicated HDR image or video content (typically brighter, maybe more contrasty, and more colorful). On the other hand however, this creates a problem: LDR image coding was designed relatively starting from white, and well-illuminated according to a middle gray of 18% reflection, which means that typically display-rendered luminances below 5% of a relatively low PB of say 100 nit will typically be seen by the viewer as difficult to discriminate dark greys, or even depending on surround illumination undiscriminable blacks. On a 5000 nit display there will be no problem with this optimally graded HDR image: 5% of 5000 nit is still 250 nit, so this will look like a normal interior e.g., and the highest 95% of the luminance range could be used purely for HDR effects, like e.g. lamps, or regions close to such lamps i.e. brightly lit. But on an LDR the rendering of this HDR grading will go totally wrong (as it was also not created for such a display), and the viewer may e.g. only see hot spots corresponding to the brightest regions on a near-black region.

In general, re-gradings are needed for creating optimal images for displays which are sufficiently different (at least a factor 2 difference in PB). That would happen both when re-grading an image for a lower dynamic range display to make it suitable for rendering on a higher dynamic range display (which would be upgrading, e.g. a 1000 nit reference display input image(s), i.e. which would look optimal on a 1000 nit PB actual display, which is then color processed for rendering on an actual display of 5000 nit PB), as the other way around, i.e. downgrading an image so that it would be suitable for display on an actual display of lower PB than the reference display associated with the grading which is coded as video images (and which images are typically transmitted in some manner to a receiving side). For conciseness we will only describe the scenario where an HDR image or images is to be downgraded to LDR.

HDR technology (by which we mean a technology which should be able to handle at least some HDR images, which may be of considerable complexity i.e. high peak brightness, e.g. 10000 nit, but it may work with LDR images, or medium dynamic range images, etc. as well) will percolate in various areas of both consumer and professional use (e.g.

cameras, data handling devices like blu-ray players, televisions, computer software, projection systems, security or video conferencing systems, etc.) will need technology capable of handling the various aspects in different ways.

In Wo2013/144809 (and WO2014/056679) applicant formulated generically a technique to perform color processing for yielding an image (Im_res) which is suitable for another display dynamic range (typically the PB suffices to characterize the different display dynamic ranges and hence optimally graded images, since for several scenarios one may neglect the black point and assume it is pragmatically 0) than the reference display dynamic range associated with the input image (Im-in), i.e. which basically formulates the PB of a display for which the image was created as looking optimally, which forms good prior art for the below elucidated invention to improve thereupon. We reformulate the principles concisely again in FIG. 1. However, the reader should understand that some of the properties of the prior art example are relevant in the context of the present embodiments, and some are not present in a general HDR encoding, and no limitations of our present embodiments and teachings, as the can work with such various HDR video (or image) codec technologies.

In particular what is relevant is that one has two different dynamic range looks on a scene, which can be related to each other via a color transformation (e.g. as FIG. 4 elucidates, one can chose to considerably lower the luminance, or equivalently luma (which are the codes encoding the corresponding lumas in a e.g. typically 10 or 12 bit representation), of a street light, and squeeze all such high luminance image objects in a small sub-range of the LDR range of luminances). Although our embodiments can also work in systems which transmit some codification of the master HDR image to any receiving side, we will assume in the below elucidations we use the embodiment of communicating the LDR grading instead of the HDR images, but, together with metadata which encode the color transformation functions (some of which can work in a chromaticity plane, but we focus on luminance transformations primarily) allowing a receiver to recalculate a close reconstruction of the master HDR graded image (Im_in_HDR) of the HDR scene. This allows receiver with HDR capability to render HDR images on a connected HDR display, but also the rendering of legacy LDR images for people who still have an LDR tv or computer monitor, projector, portable display, etc.

This principle is applicable (buildable) generically, i.e. what should not be assumed are any particular limitations regarding the color format of the input image, nor the output image, nor the color space in which the color processing is happening, in particular where the prior art mentions some specific linear RGB processing, for this text we explicitly state that we invented and describe some non-linear color space processings, and the coding strategies based thereupon.

The various pixels of an input image Im_in are consecutively color processed by a color transformer 100 (which we assume here resides in a video encoder, getting HDR video to be encoded as input, and outputting LDR images, which however still optimally contain the HDR information also, though be it in a re-graded LDR look), by multiplying their linear RGB values by a multiplication factor (a) by a multiplier 104, to get output colors RsGsBs of pixels in an output image Im_res. The multiplication factor is established from some tone mapping specification, which may typically be created by a human color grader, but could also come from an auto-conversion algorithm which analyzes the characteristics of the image(s) (e.g. the histogram, or the color properties of special objects like faces, etc.). The mapping function may coarsely be e.g. gamma-like, so that the darker colors are boosted (which is needed to make them brighter and more contrasty for rendering on the LDR display), at the cost of a contrast reductions for the bright areas, which will become pastelized on LDR displays. The grader may further have identified some special object like a face, for which luminances he has created an increased contrast part in the curve. Specifically this curve is applied to the maximum of the R,G, and B color component of each pixel, named M (determined by maximum evaluation unit 101), by curve application unit 102 (which may cheaply be e.g. a LUT, which may be calculated e.g. per shot of images at a receiving side which does the color processing, after typically having received parameters encoding the functional shape of the mapping, e.g. a gamma factor), but the same principles can also work if M is a luminance, or some non-linear representation of a luminance or brightness, like e.g. a luma, or a power 1/N of a luminance, with N some e.g. integer number, etc. Then a multiplication factor calculation unit 103 calculates a suitable multiplication factor (a) for each currently processed pixel. This may e.g. be the output of the tone mapping function F applied to M, i.e. F(M), divided by M, if the image is to be rendered on a first target display, say e.g. a 100 nit LDR display. If an image is needed for e.g. an intermediate display, e.g. 800 nit PB (or another value, maybe higher than the reference display PB of the HDR input image Im_in), then a further function G may be applied to F(M)/M rescaling the amount of multiplicative mapping of the input color to the value appropriate for the display dynamic range for which the image is suited (whether it is directly rendered on the display, or communicated, or stored in some memory for later use). This is a manner to represent some brightness transformation, which may be quite complex, as a multiplication. Although the prior art we mentioned for elucidating the background knowledge for this invention may typically multiply linear RGB components, we emphasize that the present invention embodiments may also work on non-linear e.g. typically RGB color representations, e.g. Rec. 709 OETF transformed R'G'B' components, or powers of R,G, and B with typically a power value smaller than 1, e.g. ½.

The part we described so far constitutes a global color processing. This means that the processing can be done based solely on the particular values of the colors (and we will only focus on the luminances of those colors) of a consecutive set of pixels. So, if one just gets pixels from e.g. a set of pixels within a circular sub-selection of an image, the color processing can be done according to the above formulated principle. However, since human vision is very relative, also spatially relative, whereby the colors and brightnesses of objects are judged in relation to colorimetric properties of other objects in the image (and also in view of various technical limitations), more advanced HDR coding systems have an option to do local processing. In some image(s) one would like to isolate one or more object(s), like a lamp or a face, and do a dedicated processing on that object. However, again emphasizing the point, in the here presented technology, this forms part of an encoding of at least one further grading derivable from an image of pixels of a master grading (here LDR derived from HDR), not merely some isolated color processing. Since simpler variants in the market will not use local processing (although it is conceptually similar, but leads to i.a. more complex integrated circuits), and the below principles can be explained without those specifics, we will not further details that aspect.

Either the master grading or the derived grading may be actually communicated to a receiving side, as the images encoding the spatial structure i.e. the objects of the imaged scene, and if the color transformation functions encoding the relationship between the two looks are also communicated in metadata, then other gradings can then be re-calculated at a receiving side. I.e., the color processing is e.g. needed to construct by decoding an LDR image if needed, in case HDR images have been received, or vice versa a reconstruction of HDR images in case of the pair of looks the LDR images have been communicated, or stored. The fact that the local processing principle is used in an encoding technology has technical implications, inter alia that one needs a simple set of basic mathematical processing methods, since all decoding ICs or software out in the field needs to implement this, and at an affordable price, to be able to understand the encoding and create the decoder LDR image(s).

When designing pragmatically useful coding technologies for the various image or video using markets, a technical limitation is that from an IC point of view (since also cheap apparatuses may need simple ICs or area parts of an IC, or software), the coding function tools should be few, and smartly chosen, to do what is most needed for the creation and encoding of various dynamic range look images on a scene (so that any "grader" or content creator in any content creation variant gets the desired result of creating an (sufficiently close to his desires) HDR/LDR image look pair and the corresponding encoding for storage or communication thereof). On the other hand, another problem with that is that with the above explained philosophy, where e.g. a human color grader specifies the re-grading, as encoded by e.g. a LDR image and functions to re-grade to a suitable HDR image at any receiving side receiver, in a set of optimal parameters for the specific look of a given scene, the grader must also have the right grading/coding tools and in the right order so that he can conveniently work with them (not only does he need to obtain the good precision of the desired color look, but he needs to do that with as few operations as possible, to quickly and efficiently get the look he wants since time is also of the essence). This dual opponent set of constraints need to be provided for in an elegant manner. Furthermore in case LDR images are transmitted to any receiver there is even a third criterion one must look at, and technological solutions like the below must at least roughly satisfy, namely that when having designed some LDR look image(s), the reconstruction of the HDR images by a receiver HDR decoder must still be of sufficient precision, so that also has an impact of the resultant optimal technical apparatus units for generic HDR encoders and decoders as they are invented.

Hattori et al: "HLS: SEI message for Knee Function Information", 16. JCT-VC MEETING; Sep. 1, 2014, San Jose, describes a new SEI message to specify a relationship between input HDR luminances, on an input dynamic range, up to e.g. 1200% of a scene white level (i.e. codes up to 1200 nit), and LDR lumas, based on one or more knee points. The knee point was a trick to solve the problem that digital sensors, when illuminated according to an average grey world assumption, had a problematic tendency to hard clip scene objects that where only a little brighter than scene white (which would be about 5× brighter than scene average gray). The idea would be that if one had a better sensor, with less noise for the darker scene luminances, then one could under-expose the scene a little, allowing a discrimination of various brighter than scene white (e.g. a white dress of a bride under the optimal scene illumination) scene luminances, e.g. up to 4× scene white (rather than bluntly clipping to code white, luma Y'=255 in 8 bit, everything above e.g. 1.2× scene white). Of course capturing such brighter scene luminances accurately in the camera sensor was only part of the solution, as one also still needed a trick to allocate actual 8 bit luma code to the analog sensor-determined (relative to the maximum still recordable scene luminance, or 1.0) scene luminances, when calculating an SDR image for consumption, e.g. rendering with a good image quality on a SDR 100 nit PB display. It would not be an elegant solution to just compress all colors on the SDR output luma axis to be able to fit the 4×, or even 12× upper range, because then the darker objects, which should also be well exposed to be well visible, might be too dark for good SDR image quality. So one came up with a technique which kept the classical (Rec. 709) luma allocation of the darker lumas, up to a knee point, and above that knee point one used a more compressed, typically logarithmic luma code allocation strategy, so that a far greater upper range of input luminances (e.g. the range of 1× scene white to 4× scene white) could be mapped to an upper range of the luma codes, e.g. the upper 10%, depending on the position of the knee point (or in case one wants to squeeze a significant amount of brighter than scene white luminances in the SDR image, one could choose a knee point at 50% of the luma range, i.e. 128 in 8 bit, or 512 in 10 bit, but then the color look of the image, though still watchable, may start to deteriorate significantly). Hattori introduces a technique, and a practical manner to quickly convey all needed information to decoders, which need that information to apply the inverse function to do reconstruction of the HDR image when receiving the SDR image, based on one or more such knee points. A kneeing mechanism is not a good manner to accurately control the look of a SDR image. It is an easy manner though to bend a higher dynamic range (input_d_range) with a simple quick function continuously bending higher brightness subranges into smaller subranges of the SDR luma (assuming that this will not be problematic, which is not necessarily true if one has important image content in e.g. the brightest regions, like e.g. clouds which may have beautiful bright grey values, which may get destroyed by a wrong simple logarithmic part of a knee function), especially when the Kx factor specifying up to how many times above scene white luminances should still be codable, is not too high (i.e. medium high dynamic range scenes). It is clear that this document doesn't teach a simple highly usable coarse grading function, which is especially usable when a human grader wants to precisely optimize the look of the image (in contrast with Hattori, which is just the mathematical specification of some reasonably working luminance-to-luma mapping, which can blindly be used by any automatic apparatus, because it's sole purpose is to code merely a HDR look image, i.e. reconstructable at a receiving side, and not necessarily and artistically best looking SDR image, applicant wanted to design a system which, although in some embodiments also working (semi)automatically, should with the same coding principles also cater for markets that have artistically precise desiderata, like accurate color grading by a human color grader on a Hollywood movie). More specifically, even when also the control of a precise darks and brights sub-region of the HDR scene image is not taught, there clearly is not the teaching of the parabolic middle segment, nor does Hattori inspire to doing the HDR research that one needs to come to such a realization.

US 2015/010059 also contains this same knee-point curve (model 3: number of pivot points) communicated as a SEI image teaching, and also contains a teaching of an S-curve, which is merely another possible HDR-to-SDR mapping curve, unrelated to our present application teachings.

Zicong Mai et al.: "Optimizing a Tone Curve for Backward-Compatible High Dynamic Range Image and Video Compression", IEEE Transactions on image processing, vol. 20, no. 6, June 2011, is also a manner to communicate reconstructable HDR images actually as SDR images, but in a very different manner, namely by calculating an image-optimal mapping function shape, which is determined based on the luminance histogram of the input image (to not allocate too few codes to big regions, which could introduce banding, see FIG. 3).

WO2014/178286 is also again a knee-type encoder (FIG. 3), allowing inclusion in the SDR code of somewhat more brighter than scene white scene luminances (Nx). This can then be used to render HDR images (which nicely bright brightest objects) on HDR displays which have a Nx brighter peak brightness than SDR displays, e.g. when N is 8 or 10 (FIG. 7).

WO 2014/128586 also contains various technical teachings to communicate HDR images of a HDR scene actually as SDR images, usable for direct rendering on legacy SDR displays already deployed in great numbers at viewer's premises. It teaches that sometimes an image-specific highly customized luminance mapping curve shape may be useful (FIG. 8), but teaches nothing like that the present coarse function may be a particularly useful function in a practical HDR co-communicated with a corresponding graded SDR technology.

None of the prior art inspires even in the direction of the elegant simple HDR encoding system of the present application, which allows even critical color graders to efficiently come to a good quality SDR image, for all practical purposes.

SUMMARY OF THE INVENTION

The above problem of having a practically usable coding system which is both sufficiently computationally simple for IC to run it at video speed, yet also sufficiently versatile and handy for a grader to specify any detailed color look for displaying on any intended display (at least on a HDR display, and another one, typically a legacy LDR display, but the encodings preferably look good on a range of displays, at least in between the HDR display for which the HDR look is encoded, and the LDR display for which the LDR look is co-encoded, by means of the parameters specifying the functional re-grading color transformation starting from the HDR image, both images being typically defined as 10 bit words scaled to [0,1]) is solved by HDR video decoder (250) comprising an image color processing apparatus (200) arranged to transform an input color (Y'UV_LDR) of a pixel of an input image (Im_in), which input image has a first luminance dynamic range (DR_1), into a red, green and blue color component output color (R'o, G'o, B'o) of a pixel of an output image (Im_res; REC_HDR), which output image has a second luminance dynamic range (DR_2), whereby the peak luminance of the first dynamic range is at least 2 times lower than the peak luminance of the second dynamic range or vice versa, comprising a coarse mapping unit (202; 552) arranged to apply a three-segment brightness re-grading curve which consists of a linear segment for a dark sub-range (SR_d) of the range of lumas of the input image colors comprising the darkest input luma values, which is determined by a slope variable (InvBet), a second linear segment for the lightest input luma values in a bright sub-range (SR_br), which is controlled by a second slope variable (InvAlph), and a parabolic segment in between the two linear segments.

The creation side, e.g. a person tuning the parameters, can determine the needed slopes dependent on the properties of the HDR scene or the image thereof, and secondly where desired the properties of the coding in which the image is going to be encoded. If typically the output image of an encoding (being the input image which receivers and their comprised decoders will receive) is a 100 nit PB Rec. 709 SDR encoding, the e.g. grader (or automatic curve determination algorithm based on measured image characteristics) may e.g. determine the curve shape on the PB of the input master HDR image (e.g. 5000 nit vs. 1000 nit PB). But he may also determine the exact shape based on the content. E.g., if there is much dark content like the motorcycle in FIG. 4, the grader may want to have those as relatively deep luminances in a HDR image rendering on a HDR display (e.g. 2000 nit PB), but as relatively highly brightened in the LDR image encoding of the HDR scene (which must look visible when rendered on a typical SDR display). The creator may also take already typical LDR image coding specifics into account, like e.g. the number of bits which the e.g. HEVC codec will use for encoding the LDR images. Some embodiments of the decoder may determine autonomously the parabolic region between the linear segments, e.g. always fixed 20% of the input luma range, or a percentage dependent on the slope of the two segments (e.g. more if the difference in slope is larger), or even based on the characteristics of the current shot of images, e.g. whether there is much detail in the middle range of brightnesses above the dark range, or whether there are smooth gradients, etc.

However, in other embodiments the grader or in general creator can specify the width of the parabolic region, e.g. he may specify two widths (being from which point the parabolic part changes into a linear part) W1 and W2 from some defined point the decoder can establish, e.g. where the linear parts when continued would intersect. Or he can communicate this as a single width value. The only necessary requirement is that the decoder can apply the inverse three-segment brightness re-grading function to obtain from the received LDR image(s) the reconstructed HDR look image of the HDR scene. In various embodiments one can either send the parameters of the concave upwards bending function as shown in FIG. 2 (i.e. InvBet, InvAlph) or similarly he can send the downgrading curve parameters (alph, bet). One curve can be easily converted into the other, e.g. one can establish a LUT to a desired precision and then interchange the axes, so the skilled reader will understand that for simplicity of elucidation we talk about both possibilities in actual realizations. In general there may be two further parameters if desired, e.g. a white offset Wh_o, which prescribes where on the output LDR luma code range the brightest HDR code falls (or typically in other embodiments it may also be defined on the vertical axis from the HDR brightest input luminance or luma, in which case HDR colors above this value are clipped in the LDR representation, which may be useful or undesirable depending on the particular application of the image encoding. Similarly there may be a dark offset B_o, which the grader may determine based on other principles, because dark color rendering on displays differs from bright color rendering. So it may be useful in a general system to have an encoder embodiment which supplies 5 parameters, alph, bet, W (=W1+W2, and defined in a pre-agreed manner, e.g. 50% on either side of the crossing point 303), B_o and Wh_o.

Simple embodiments will suffice with the three-segment curve. More advanced embodiments may apply further color transformations. E.g. a first pre color transformation unit 224 may apply a transformation before the application of the three part curve, which may e.g. distribute the colors of the image(s) more uniformly, e.g. for a human viewer. A post color transformation unit 203 may apply another color transformation function, e.g. the grader could darken some specific part of the luma range compared to the brightness look resulting from the three part curve. A domain color transformation unit 204 may do further color space transformations, e.g. instead of getting a Y'o result in a square root or Rec. 709 domain, similarly calculations could be done in e.g. a perceptually linearized domain, etc. Of course, the input and output color domains may typically influence the exact shape of the three part curve and its characterizing 2, 3 or 5 parameters as described above. Finally, after having done the required color transformations, yielding a result in e.g. a Rec. 709, some HDR luma definition e.g. with PQ or even a linear R'o, G'o, B'o color component specification, a color formatting unit 226 may further specify the colors in a final RGB color space, e.g. Rd, Gd, Bd suitable for directly driving a connected display, which may typically be a HDR display expecting on its image connection (cable or wireless) some HDR image definition, e.g. typically according to some pre-specified Opto-electronic transfer function (OETF), which may be a standard one, or a display-specific one. The customized function application unit (203) allows that one can design a very specific accurate function, based on the needs of this current HDR scene (in particular how complex it is to puzzle together all the object brightnesses on the much smaller LDR luminance range), in a place where that can be done (with e.g. sufficient time, calculation resources, etc.), i.e. typically at the creation side (and the information of the shape of this function being communicated to a receiving side apparatus). In particular, a human color grader can fine-tune the non-linear shape to bend it in all the appropriate places corresponding to the luminances of major objects or regions of the starting image. He can so brighten e.g. a small part, to any luminance in the derived image as he desires. In particular, if most of e.g. an indoors scene has the correct luminance already, but some small piece of sky seen through a window is too bright or dark, the custom curve CC can be so designed to color transform only those pixel colors. For some specific embodiments the custom curve can even be so designed that its gradient doesn't go below a minimum value anywhere along the input range. We designed our system to be able to fit in various kinds of HDR image or video handling systems in the future market (e.g. broadcasting, LDR-based over existing satellite channels; versus internet-delivery), and various kind of content (very spectacular HDR artistic images from Hollywood, versus an in the field production, which happens to have the dynamic range it happens to have), so our custom curve unit allows for implementing whatever specific luminance (brightness) behavior for whichever parts of an image need it, and in the various implementations with however much or little implementation effort on the creation side this may have been realized with.

The following non exhaustive embodiments have particular usefulness.

An HDR video decoder (250) as claimed in claim 1 in which the image color processing apparatus (200) is arranged to apply the three-segment curve to low dynamic range lumas (Y'_LDR). It may be useful to work in some particular domains, e.g. a luma domain of one of the two gradings, e.g. typically SDR lumas.

An HDR video decoder (250) in which the image color processing apparatus (200) is arranged to yield as a result of applying the three-segment curve an output luma (Y'o) which is related to the luminance of the color being the output result of applying the three-segment curve to the input color by a power function with a power 1/N, wherein N is preferably 2.

An HDR video decoder (250) in which the image color processing apparatus (200) is arranged to determine the output color by comprising a multiplier (225) arranged to apply a multiplication with as a multiplicative factor the output luma (Y'o) to a preferably non-linear color representation (R's, G's, B's) of the color of the currently processed pixel.

An HDR video decoder (250) in which the image color processing apparatus (200) is arranged to obtain the non-linear color representation (R's, G's, B's) which is technically defined from linear R, G, B color components by a non-linear function, which is close in shape to a square root function, and which is preferably a power function with a power 1/N with N an integer value.

An HDR video decoder (250) comprising a reading unit (277) arranged to read from received metadata the first and second slope variable, and arranged to supply it to the coarse mapping unit (202; 552).

An HDR video decoder (250) in which the reading unit (277) is further arranged to read a width of a parabolic region (W_par) between the two linear segments from received metadata, and arranged to supply it to the coarse mapping unit (202; 552).

A method of video decoding to yield a decoder HDR video of consecutive images, comprising applying a three-segment brightness re-grading curve which consists of a linear segment for a dark sub-range (SR_d) of the range of lumas of the input image colors comprising the darkest input luma values, which is determined by a slope variable (InvBet), a second linear segment for the lightest input luma values in a bright sub-range (SR_br), which is controlled by a second slope variable (InvAlph), and a parabolic segment in between the two linear segments, which yields an output luma (Y'o) to be supplied to a multiplication with a preferably non-linear RGB color representation (R's, G's'B's) of the input color being color transformed.

A HDR video encoder (501) comprising an image color processing apparatus (200) arranged to transform an input color of a pixel of an input image (Im_in), which input image has a second luminance dynamic range (DR_2), into a output color (Y'UV) of a pixel of an output image (IMED), which output image has a first luminance dynamic range (DR_1), whereby the peak luminance of the first dynamic range is at least 2 times lower than the peak luminance of the second dynamic range or vice versa, comprising a coarse mapping unit (503) arranged to apply a three-segment brightness re-grading curve which consists of a linear segment for a dark sub-range (SR_d) of the range of lumas of the input image colors comprising the darkest input luma values, which is determined by a slope variable (InvBet), a second linear segment for the lightest input luma values in a bright sub-range (SR_br), which is controlled by a second slope variable (InvAlph), and a parabolic segment in between the two linear segments.

A HDR video encoder (501) in which the image color processing apparatus (200) is arranged to apply the three-segment curve to a color representation of the input color which is in a non-linear domain, characterized in that its color components are defined by non-linear functions based on linear red, green and blue additive color components.

A HDR video encoder (501) in which the image color processing apparatus (200) is arranged to apply the three-segment curve to a linear red, green and blue color representation of the input color.

A HDR video encoder (501) in which the image color processing apparatus (200) is arranged to determine the output color in a representation comprising a non-linear luma (Y'o) which is related to the luminance of the output color by a non-linear function.

A HDR video encoder (501) in which the image color processing apparatus (200) is arranged to determine the output color in a representation defined by a standard dynamic range video encoding, characterized in that the output luma (Y'o) color component is defined by a Rec. 709 Opto-electrical transfer function or a square root.

A method of HDR video encoding, yielding a HDR set of images encoded in low dynamic range images, comprising transforming an input color of a pixel of an input image (Im_in), which input image has a second luminance dynamic range (DR_2), into a output color (Y'UV) of a pixel of an output image (IMED), which output image has a first luminance dynamic range (DR_1), whereby the peak luminance of the first dynamic range is at least 2 times lower than the peak luminance of the second dynamic range or vice versa, comprising applying a three-segment brightness re-grading curve which consists of a linear segment for a dark sub-range (SR_d) of the range of lumas of the input image colors comprising the darkest input luma values, which is determined by a slope variable (InvBet), a second linear segment for the lightest input luma values in a bright sub-range (SR_br), which is controlled by a second slope variable (InvAlph), and a parabolic segment in between the two linear segments.

A computer-readable memory comprising code which when run by a processor will apply all steps as defined in any of the above method claims, and signals whether on memories or other technical means comprising the information allowing a receiver to technically function to decode and reconstruct the received HDR (as LDR) images, i.e. by receiving some pixellized color component data, and metadata specifying the three-segment curve, i.e. typically the above at least two, or preferably 5 parameters (alph, bet, W, Wh_o, B_o).

BRIEF DESCRIPTION OF THE DRAWINGS

These and other aspects of any variant of the method and apparatus according to the invention will be apparent from and elucidated with reference to the implementations and embodiments described hereinafter, and with reference to the accompanying drawings, which drawings serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions, indications of value levels in charts, etc.

In the drawings.

DETAILED DESCRIPTION OF THE DRAWINGS

Figure 1:
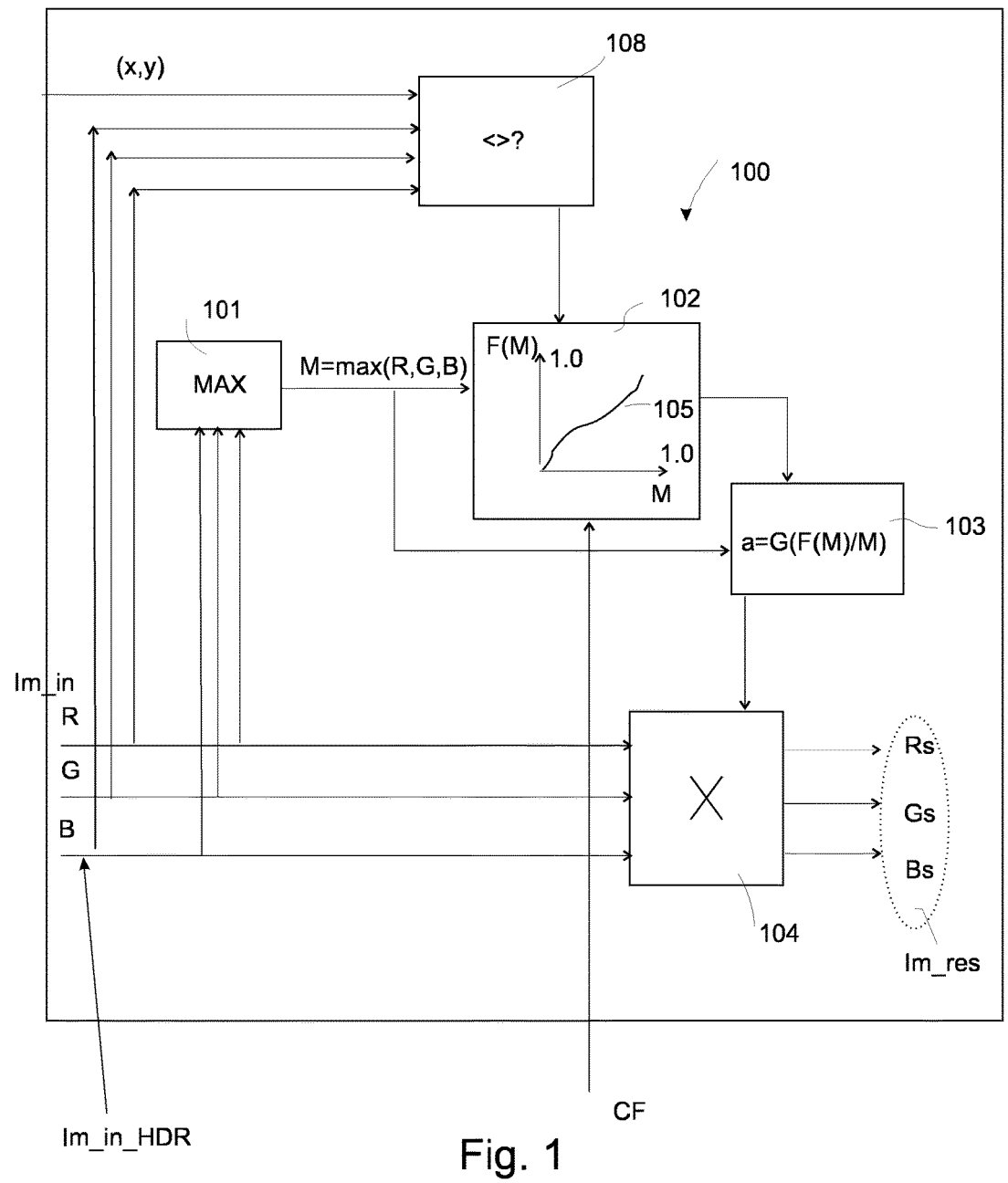
FIG. 1 schematically illustrates a possible color processing apparatus previously invented and patented by applicant for doing dynamic range transformation including local color processing, which color processing will typically include at least changing the luminances of objects in an input image, which will elucidate some concepts, however, preferred embodiments of the present invention will be applied mutatis mutandis in non-linear RGB color spaces and typically their corresponding luma Y'.

FIG. 1 schematically shows one possible color transformation of a system to encode (at least) two graded images (HDR, e.g. 5000 nit PB, and standard SDR LDR with PB=100 nit) for rendering on displays of considerably different dynamic range (PB), and in particular a color transformation core unit thereof. The skilled reader understands that this system can both reside at a content creation side, in which the human grader will do the calculations to check on calibrated displays which looks he is actually making when at the same time specifying the according to his taste optimal parameter values of our grading functions in the coding function toolkit, and at a receiving side, where the apparatus may be included e.g. in a video receiving and color processing device like a settopbox, BD player, or computer, or a display itself, or a professional system in a movie theatre, etc.

We will elucidate the receiving side, where we already have the data specifying the two gradings (HDR and LDR, which can then further be optimized by further calculations for any intermediate dynamic range MDR display of e.g. PB=800 nit).

So according to our novel encoding principles, the receiving apparatus actually has only one image actually encoded (e.g. classically in a 10 bit HEVC encoding, though understandably decodable to a normalized [0,1] image), Im_in_HDR, e.g. received on a blu-ray disk, or via an internet connection to a video server, or over an HDMI cable from some other apparatus, etc. This then has to be calculated into an LDR grading, e.g. because an LDR display is connected, and needs the correctly graded LDR image (e.g. the viewer decides to stop watching his living room HDR display but continue watching in bed on his portable pad PC).

To be able to do the color processing, the color transforming apparatus also needs the parameters (CF) specifying the functions. The skilled person understands that e.g. a parabola could be specified by a starting and end point, and a linear starting slope and curvature, etc.

Typically both saturation control of the mapping from HDR to LDR may be involved but also at least a mapping which affects the luminances of the output objects (although mathematically we typically apply that luminance mapping by multiplicatively scaling linear RGB color components).

Figure 2:
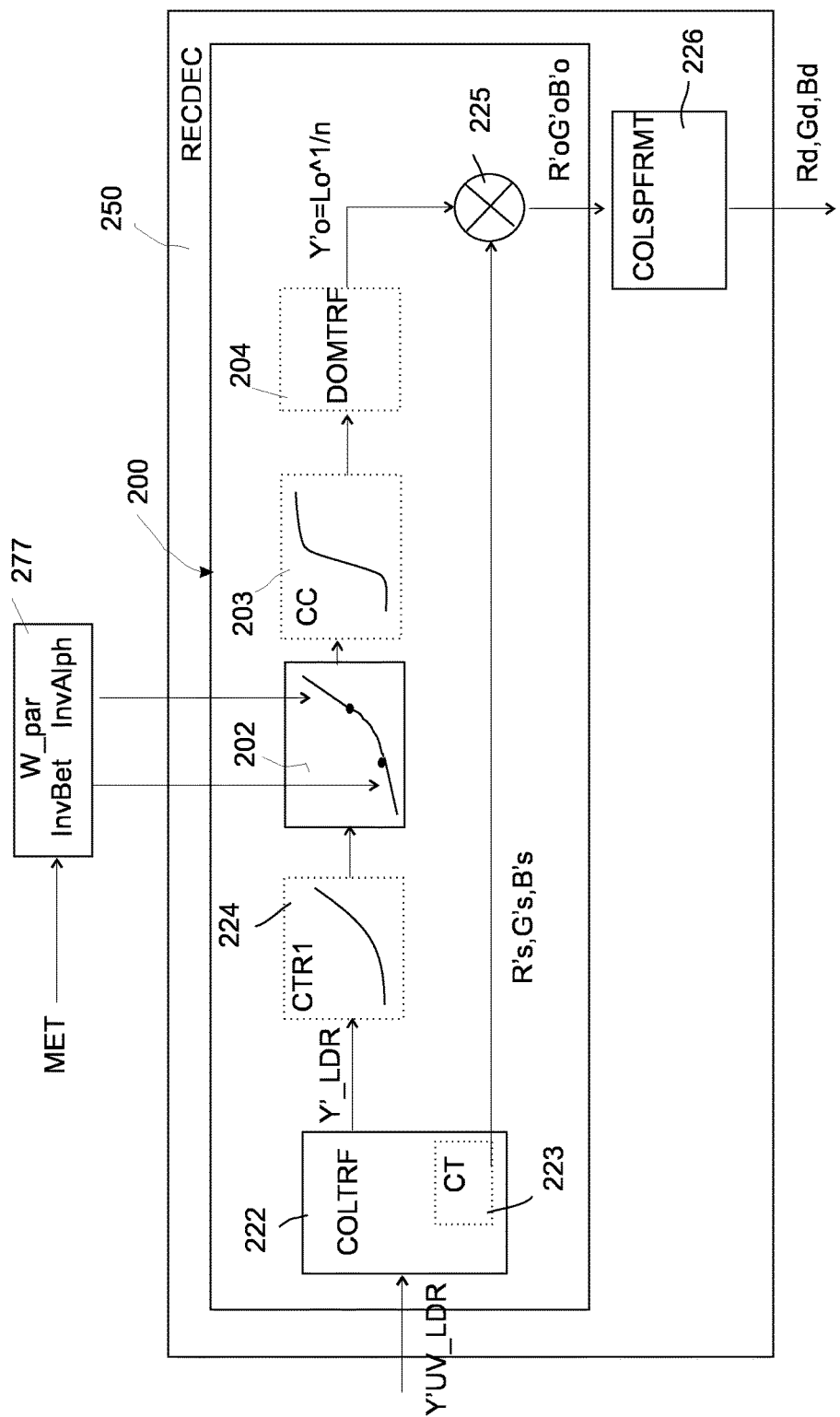
FIG. 2 schematically illustrates an example of a system which is arranged to do a dynamic range transformation for a system which is able to decode in a parametric manner and yield a HDR image from a received LDR image, i.e. whereby although also a HDR look on a HDR scene has been received via metadata characterizing color transformation functions for deriving the HDR look image from the received LDR look image, only the LDR image pixel colors are actually transmitted to a receiving side and received.

FIG. 2 shows in more detail how preferably one can do that luminance re-grading.

We assume that SDR images come in, i.e. Y'UV (or Y'CbCr) encoded. They can be matrixed to scaled RGB components R'sG'sB's of the input image pixels. We assume that these are in e.g. square root luma domain (i.e. the corresponding linear color components would emerge by squaring). The corresponding Y'_LDR luma is easily split off from the Y'UV representation. That these R'sG'sB's values are actually some scaled version of the ultimately to be obtained HDR color components (R'o, G'o, B'o) can be seen in FIG. 4B, in which we show one color of both the LDR and HDR gradings in the same normalized to maximum luma=1.0 RGB color gamut (e.g. of Rec. 2020 primaries, etc.). If the motorcycle must be rendered at the same absolute luminance (5 nit) on a LDR display when driven with the LDR image as it would have on a HDR display when driven with the HDR image, that means that its (relative, normalized to one, or to 1023 for 10 bit codes) LDR luma must be higher. I.e. the color transformation between color components R'o, G'o. B'o and R's, G's, B's, or vice versa, also corresponds to a scaling of their corresponding respective luminances or lumas Y'_HDR respectively Y'_LDR, and that is what will be realized by the multiplier 225. In some embodiments the R's, G's, B's may be directly calculated from the input Y'UV color representation, though in other embodiments there may be further color transformations involved to arrive at different R's, G's, B's values, which will be applied by color transformer 223 (note that all dashed parts of the Figures are optional, not for the simpler embodiments in the market, but for some other embodiments). This may apply a further brightness and/or chromatic fine-tuning, e.g. some look adjustment, etc.

Reading unit (277) then supplies the data to allow the coarse mapping unit 202 to apply the appropriate function which was used to co-encode the HDR/LDR look image pair, i.e. also how to reconstruct the HDR image from the received LDR one, e.g. it may pass the parameters, or supply the function as a LUT. Then a correctly scaled luma Y'o obtained from applying (at least) the three-segment curve mapping is used as an input multiplier, to multiply each of the three scaled color components with, yielding the correct output color, which may be further transformed into another color representation by color formatting unit 226.

Figure 3:
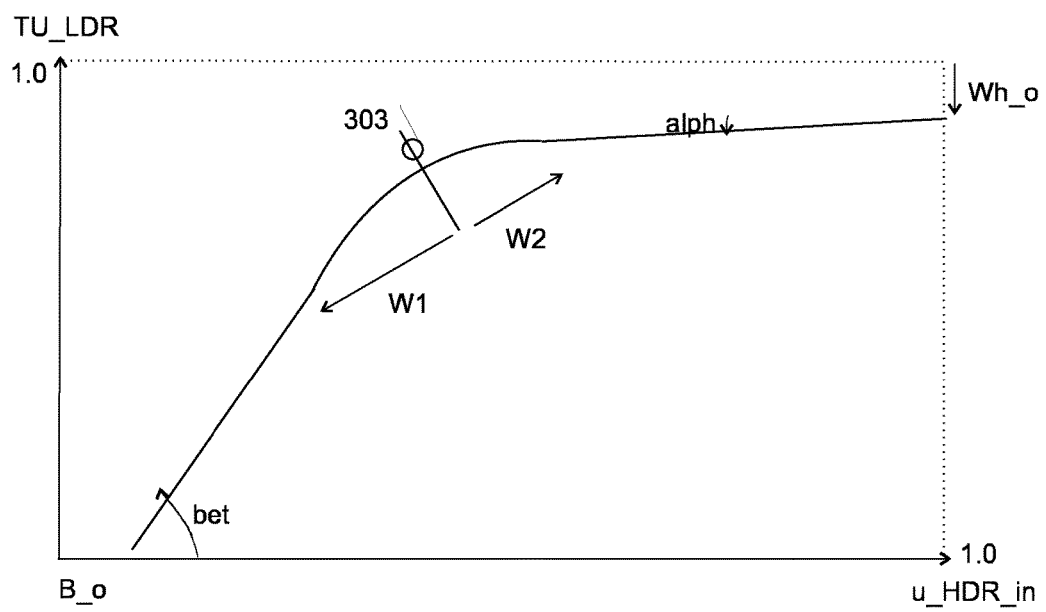
FIG. 3 shows an encoding-side functional shape of one typical three-segment coarse initial luma mapping for coding LDR from HDR image pixel color data, where the input may e.g. be in a HDR linear luminance domain, and the output (vertical axis) e.g. typically in a LDR square root LDR luma domain.

A good embodiment of the coarse mapping unit (202) will apply a function like e.g. in FIG. 3. The position of the parabolic segment may be determined by encoding a starting and end luma value, but the parabola can also be encoded as a width of it, as in FIG. 3. The input is in this example non limiting a linear RGB representation's luminance, namely u_HDR_in, and the output TU_LDR_out is what can if desired in a particular usage system afterwards be fine-tuned by the custom-shaped curve of unit 203, or otherwise sent to the multiplier to obtain the correct HDR color for this pixel being processed.

In this embodiment the basic "parabola" tone mapping curve consists of 3 segments:

a dark segment through (0, 0), which is controlled by the parameter slope bet or bg (base gain)

a bright segment through (u_max, TU_max), with slope alph, or dg (differential gain)

parabola segment that connects the two, with width xp (x-width parabola)

Without the parabola, the 2 linear segments connect in the point $$um=(TU\_\max-dg*u\_\max)/(bg-dg),$$

$$TUm=bg*um=TU\_\max-(u\_\max\_um)*dg.$$

We make a continuously differentiable curve by adding a parabola which is centered around this (um, TUm), and it must begin with slope=bg and end with slope=dg. From mathematical calculation we then get that only 1 (of 3) degree of freedom is left: the width of the parabola xp.

Depending on the width, the y value for u=um drops from $TU=TUm$ for up=0 to $$TU=TUm-\text{delta}\_TU=TU-up*(bg-dg)/8.$$

One can invert this relation for calculating up from delta_TU:

$$up=8*\text{delta}\_TU/(bg-dg).$$

So typically one can start with up=0, then see what the maximum distance delta_TU is between the bent curve and the reference luminance mapping curve (scatter plot), and calculate up from this.

So in this embodiment the width (typically between 0.0 and 1.0) of the parabolic segment will be the third parameter specifying this functional shape which is communicated to any receiving side apparatus, in addition to the base gain slope (e.g. with typical values between 0.5 for bright images and 1.0 for dark images), and the lightest inputs range slope (typically between 0.0 and 0.25).

Figure 4:
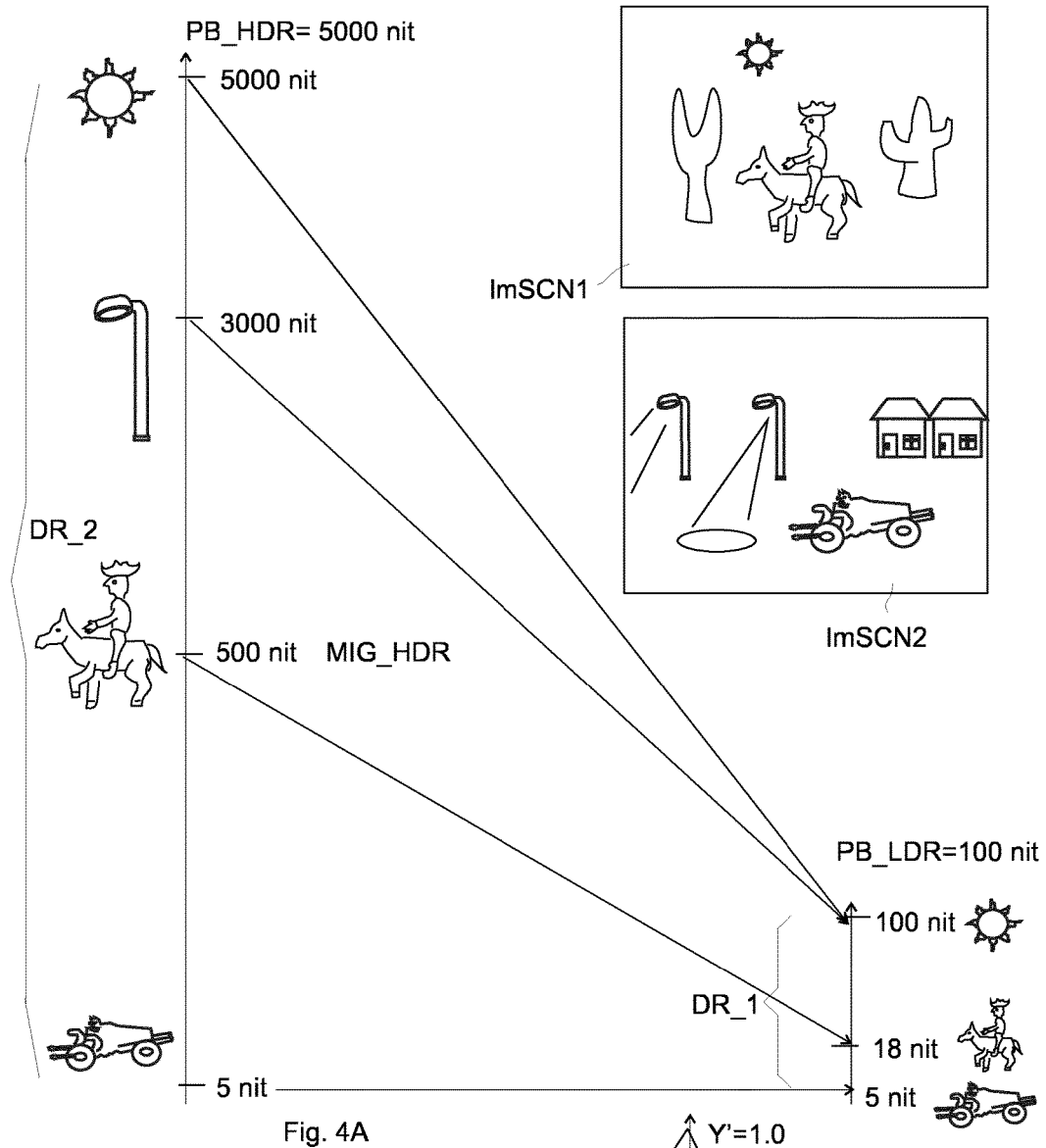
FIG. 4 clarifies with a couple of examples what the technical and artistic issues typically are with HDR content which needs to be viewable on displays of lower dynamic range, even an installed base of legacy 100 nit peak brightness (PB) SDR displays.

In FIG. 4 we see just two examples of the many possible HDR scenes a HDR system of the future (e.g. connected to a 1000 nit PB display) may need to be able to correctly handle, i.e. by creating the appropriate luminances for all objects/pixels in the image, in the ultimately to be rendered image on whatever connected or envisaged to be connected display. E.g. ImSCN1 is a sunny outdoors image from a cowboy movie playing in Texas, and ImSCN2 is a nighttime image. What makes HDR image rendering different from how it always was in the LDR era which ended only recently (or actually is going to start in the market the coming years), is that the LDR had such a limited dynamic range (about PB=100 nit, and black level +−1 nit, or even higher in brighter viewing environment due to screen reflections), that mostly only the reflectivities of the objects could be shown (which would fall between 90% for good white and 1% for good black). So one had to show the objects independent of their illumination, and couldn't at the same time faithfully show all the very nice sometimes highly contrasty illuminations of the scene that could happen. In practice that meant that the highly bright sunny scene had to be rendered as the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. So one had to conventionally color the night scenes blue, so that the viewer would understand he was not looking at a daytime scene. Now of course in real life human vision would also adapt to the available amount of light, but not that much (most people in real life recognize that it's getting dark). So one would like to render the images with all the spectacular local lighting effects that one can artistically design in it, at least if one has a HDR display available.

But that doesn't change the fact that for some people we would still need to downgrade a fantastic new HDR movie to that limited LDR display (the range of which is shown, not to exact scale, on the right of FIG. 4).

So on the left we see what object luminances we would like to see in a 5000 nit PB (i.e. optimized for rendering on a 5000 nit PB display) master HDR grading. If we want to convey not just an illusion, but a real sense of the cowboy being in a bright sunlit environment, we must specify and render it's luminances around e.g. 500 nit. From these examples alone one can already get a feeling that puzzling all objects together on the smaller LDR luminance range is ideally not going to be a matter of simple compression (e.g. with a linear function mapping the HDR PB to the LDR PB, and therewith all lower luminances also). On the contrary, we give two examples of different luminance mapping-behavior class. For the daylight scene, if one wanted to calculate the HDR image from a received LDR image, one could apply indeed a stretching function, which stretches all luminances in such a manner that in particular the cowboy being rendered around an LDR middle grey of 18 nits maps to 500 nit in HDR (i.e. approximately a 30 times brightness increase). But one wouldn't want to do that for the night scene, or it would become ridiculously bright on the HDR monitor (actually diving into details, because of some image specifics the brain might still imagine it is seeing a night scene even when too bright, but it is rendered far from ideally, if one really want a spectacular and high quality HDR rendering, now that has become possible). For this ImSCN2, one wants the luminances of all dark objects in the night to be the same on the two displays (and all displays of intermediate PB). Rather it is the light pole light, and maybe the moon which is brightened to a very much brighter luminance in the HDR image. So the shape of the luminance mapping function will be very different. One can imagine that if one has aspects of those two archetypical images together in one image, e.g. taken inside a cave and watching the sunny outside through a small hole, one may want to design complex luminance mapping curves indeed, to get both the LDR and HDR object luminances according to one's artistic desire. How such situations typically happened in the LDR era is that one just clipped everything outside the cave to white. Or, because in the LDR era one just considered what the camera captured as relative luminances, irrespective of their meaning and what that would imply for their ultimate rendering on whatever display, some parts of the image often became too dark. E.g., if one walks through the corridor and sees the sun shining in, these sunlit spots look very bright. The other parts of the corridor are relatively darker, but that doesn't mean the person walking there sees them any darker as normal (actually, because of the extra illumination even the parts in the shadow will look somewhat brighter than if the sun moves behind the clouds). But an LDR rendering putting these sunny colors near white, can only render the shadow parts of the corridor too dark, because otherwise the only thing it can do on its limited range is render the shadows at a reasonable luminance, but then everything in the sun clips above max. luma code, e.g. 255, respectively a rendered 100 nit.

So the optimal LDR rendering of such a scene is a complex design issue, but at least now with HDR displays we could rendered the sunny parts realistically, i.e. above a certain luminance. E.g. if the viewing environment corresponds roughly to 200 nit, we can render the shadowy parts of the image around 200 nit. And we can render the sunlit parts—depending on the PB of the display—at e.g. 2000 nit. Even if that is not always exactly the same relative amount above the shadow luminance as in real life, at least it will look much more realistic than a corridor which is much too dark, or clipping.

But the reader understands why all this complexity, in particular the many kinds of image one can encounter, and the huge difference between at least some higher quality HDR ranges (e.g. PB=10,000 nit) and the SDR 100 nit range, call for a system which allows precise specification of the various pixel colors and in particular their luminances. And applicant in particular had the philosophy that one should allow the content creator to influence how any other dynamic range image will be calculated from the received image(s), at least for those who desire so, and to the extent they desire to do so, and to the extent of what they minimally need to specify.

Figure 5:
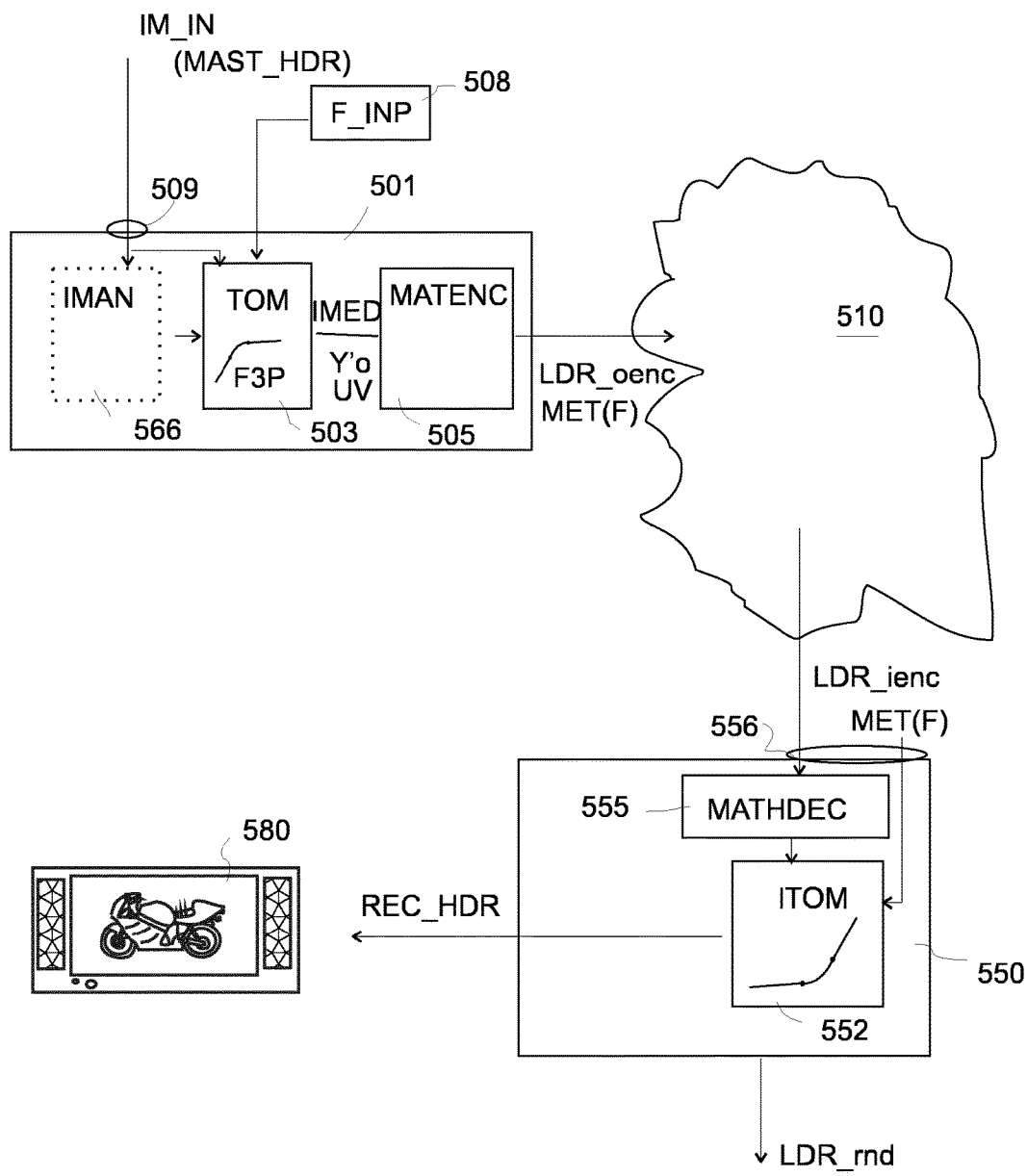
FIG. 5 schematically elucidates a little further an exemplary video coding system in which applicant's apparatus and method embodiments may advantageously be used.

FIG. 5 shows a possible incorporation of our basic luminance changing apparatus (or method), in some typical full system or chain for communication and consumption of HDR image(s). The skilled person will understand how e.g. a grader can use UI components to change the shape of any functions, e.g. their characterizing parameters, according to his needs or desires. We would like to emphasize that although we will elucidate a mode-ii example (wherein the LDR image downgraded from the master HDR image MAST_HDR that the content creator made, e.g. from his raw capturings, is actually communicated, and then at a receiving side when needed reconstructed to a close approximation of the MAST_HDR image), the system, and our apparatus embodiments can also be used in a mode-i operation, in which the MAST_HDR image is actually communicated, and the apparatus applies the luminances downgrading in a receiver in case an LDR image is needed for supplying to a SDR display. Each of those received LDR or HDR images can also be converted to images of different dynamic range, e.g. 1499 nit PB. And, the apparatus embodiments can also be incorporated in a creation-side apparatus, e.g. an encoder, e.g. to allow a color grader to check what will happen on the receiving side, and how with the given functions the LDR image calculated from the MAST_HDR will look, and the apparatuses and methods can also be used in transcoders at any intermediate location, e.g. a viewing booth of a local content distributor, etc.

A video encoder 501 in this exemplary scheme get via an input 509 an input image IM_IN, which we for simplicity of elucidation will assume is an already artistically created master HDR grading, but it may also be a HDR image from some raw image feed, which needs to be minimally color-processed with little real-time interference, maybe just dialing a knob a couple of times during capturing, etc.

There may also be chromatic processing involved calculated on the pixel colors by chromatic processing unit, e.g. a saturation change which reduces the saturation so that in the LDR conversion the brighter colors of e.g. a stained glass window can be extra brightened by pushing them in the narrow top of the LDR color gamut near white, but we will not explain those details. Then a luminance mapping unit 503 will do the various things any of our apparatus embodiments does as shown in FIG. 2, e.g. a luminance uniformization and then the three-part curve, and where applicable some optimally shaped function CC, determined for the current set of images, and e.g. loaded in by user interface interaction or from metadata encoding a previously determined function. Some embodiments will determine the shape of the three part curve by having an image analysis unit 566 analyze the characteristics of the image, such as where the majority of the pixel luminances is, the size and scatteredness of highlight patches, etc. A function input means 508 can be understood by the reader as e.g. typical color grading tools, or a connection to a database storing at least one function, or a connection to a remote human grader, etc. Then this intermediate image IMED, which now in this example is an LDR image with pixel luminances distributed along the 0-100 nit LDR range and their corresponding Rec. 709 lumas (i.e. being Y'o UV represented), is encoded with a typical legacy LDR encoding technology like e.g. HEVC by image or video encoding unit 505. This is because this "looks" like a regular LDR image, at least for the following technologies, like the image distribution pipeline it will go through, despite it actually encoding a HDR scene HDR image. We tell any receiver this by also transmitting the color transformation functions (or their inverse functions) used for generating the LDR image from the master HDR image, which tells the receiver not only that he actually receives an HDR image instead of a regular LDR image, but also allows the receiver to reconstruct a close approximation of the MAS_T HDR image, by applying those received inverse functions to the received LDR image(s). So the encoded image or video LDR_oenc actually functions as a normal LDR video for the rest of the system, and it will travel through some communication means 510, which may e.g. be an aerial broadcast, or an internet connection, or a physical memory being transported to whatever consumer or professional (e.g. cinema) location, etc.

At the receiving end this encoded output image (LDR_o-enc) becomes an input image or video LDR_ienc (it may still have undergone further transformation, but we assume for explanation purposes it is the same image(s) looped through). We should shortly note that if we use a mode-i HDR communication system in LDR_oenc, we may have used a different shape of the functions than in mode-ii, giving the image different object brightnesses and statistics, but both will be e.g. HEVC encoded.

A video decoder 550 gets via its input 556 both the images and the metadata MET(F) encoding the functions, in particular the optimal custom curve that was chosen at the creation side e.g. by a color grader or some other person like a technical director of a life production etc. An image or video decoding unit (555) decodes the HEVC video, and then it is color-processed by a luminance mapper 552 embodying any of our apparatus or method embodiments (i.e. applying the appropriate inverse three-part function for reconstructing the HDR image, at least approximately). Finally the correctly graded REC_HDR e.g. 5000 nit PB image(s) can be sent to a display 580, e.g. a 5000 nit display ideally (in case of mismatch of PB between the HDR content and the display, either this video decoder, e.g. embedded in a STB may already display-tune the image by appropriate color transformation to the needed e.g. 2500 nit display PB, or the display may do that internally by having its own version of our taught apparatuses/methods). Of course if a legacy SDR 100 nit display is to be supplied with the appropriately graded content, the video decoder 550 may supply a LDR image LDR_rnd to it, which in this example may just be the decoder-received LDR images without a need of further color transformation, but in case of receiving HDR images in LDR HEVC containers, the video decoder 550 would still do an appropriate downgrading according to any of our apparatus/method embodiments.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. A HDR video decoder comprising an image color processing apparatus arranged to transform an input color of a pixel of an input image, which input image has a first luminance dynamic range, into a red, green and blue color component output color of a pixel of an output image, which output image has a second luminance dynamic range, whereby the peak luminance of the first dynamic range is at least 2 times lower than the peak luminance of the second dynamic range or vice versa, comprising a coarse mapping unit arranged to apply a three-segment brightness re-grading curve which consists of a linear segment for a dark sub-range of the range of lumas of the input image colors comprising the darkest input luma values, which is determined by a slope variable, a second linear segment for the lightest input luma values in a bright sub-range, which is controlled by a second slope variable, and a parabolic segment in between the two linear segments.

2. An HDR video decoder as claimed in claim 1 in which the image color processing apparatus is arranged to apply the three-segment curve to low dynamic range lumas.

3. An HDR video decoder as claimed in claim 1 in which the image color processing apparatus is arranged to yield as a result of applying the three-segment curve an output luma which is related to the luminance of the color being the output result of applying the three-segment curve to the input color by a power function with a power 1/N, wherein N is preferably 2.

4. An HDR video decoder as claimed in claim 1 in which the image color processing apparatus is arranged to determine the output color by comprising a multiplier arranged to apply a multiplication with as a multiplicative factor the output luma to a preferably non-linear color representation of the color of the currently processed pixel.

5. An HDR video decoder as claimed in claim 1 in which the image color processing apparatus is arranged to obtain the non-linear color representation which is technically defined from linear R, G, B color components by a non-linear function, which is close in shape to a square root function, and which is preferably a power function with a power 1/N with N an integer value.

6. An HDR video decoder as claimed in claim 1 comprising a reading unit arranged to read from received metadata the first and second slope variable, and arranged to supply it to the coarse mapping unit.

7. An HDR video decoder as claimed in claim 1 in which the reading unit is further arranged to read a width of a parabolic region between the two linear segments from received metadata, and arranged to supply it to the coarse mapping unit.

8. A method of video decoding to yield a decoder HDR video of consecutive images, comprising applying a three-segment brightness re-grading curve which consists of a linear segment for a dark sub-range of the range of lumas of the input image colors comprising the darkest input luma values, which is determined by a slope variable, a second linear segment for the lightest input luma values in a bright sub-range, which is controlled by a second slope variable, and a parabolic segment in between the two linear segments, which yields an output luma to be supplied to a multiplication with a preferably non-linear RGB color representation of the input color being color transformed.

9. A HDR video encoder comprising an image color processing apparatus arranged to transform an input color of a pixel of an input image, which input image has a second luminance dynamic range, into a output color of a pixel of an output image, which output image has a first luminance dynamic range, whereby the peak luminance of the first dynamic range is at least 2 times lower than the peak luminance of the second dynamic range or vice versa, comprising a coarse mapping unit arranged to apply a three-segment brightness re-grading curve which consists of a linear segment for a dark sub-range of the range of lumas of the input image colors comprising the darkest input luma values, which is determined by a slope variable, a second linear segment for the lightest input luma values in a bright sub-range, which is controlled by a second slope variable, and a parabolic segment in between the two linear segments.

10. A HDR video encoder as claimed in claim 9 in which the image color processing apparatus is arranged to apply the three-segment curve to a color representation of the input color which is in a non-linear domain, wherein its color components are defined by non-linear functions based on linear red, green and blue additive color components.

11. A HDR video encoder as claimed in claim 9, in which the image color processing apparatus is arranged to apply the three-segment curve to a linear red, green and blue color representation of the input color.

12. A HDR video encoder as claimed in claim 9 in which the image color processing apparatus is arranged to determine the output color in a representation comprising a non-linear luma which is related to the luminance of the output color by a non-linear function.

13. A HDR video encoder as claimed in claim 9 in which the image color processing apparatus is arranged to determine the output color in a representation defined by a standard dynamic range video encoding, wherein the output luma color component is defined by a Rec. 709 Opto-electrical transfer function or a square root.

14. A method of HDR video encoding, yielding a HDR set of images encoded in low dynamic range images, comprising transforming an input color of a pixel of an input image, which input image has a second luminance dynamic range, into a output color of a pixel of an output image, which output image has a first luminance dynamic range, whereby the peak luminance of the first dynamic range is at least 2 times lower than the peak luminance of the second dynamic range or vice versa, comprising applying a three-segment brightness re-grading curve which consists of a linear segment for a dark sub-range of the range of lumas of the input image colors comprising the darkest input luma values, which is determined by a slope variable, a second linear segment for the lightest input luma values in a bright sub-range, which is controlled by a second slope variable, and a parabolic segment in between the two linear segments.

15. A computer-readable memory comprising code which when run by a processor will apply all steps as defined in claim 8.

* * * * *